(12) United States Patent
Zeng et al.

(10) Patent No.: US 12,432,471 B2
(45) Date of Patent: Sep. 30, 2025

(54) IMAGE SIGNAL DETECTION CIRCUIT, CONTROL METHOD AND MOTION DETECTION METHOD

(71) Applicants: SHANGHAI IC R&D CENTER CO., LTD., Shanghai (CN); CHENGDU IMAGE DESIGN TECHNOLOGY CO., LTD., Sichuan (CN)

(72) Inventors: Xi Zeng, Shanghai (CN); Xuehong He, Shanghai (CN)

(73) Assignee: SHANGHAI IC R&D CENTER CO., LTD., Shanghai (CN)

( * ) Notice: Subject to any disclaimer, the term of this patent is extended or adjusted under 35 U.S.C. 154(b) by 0 days.

(21) Appl. No.: 18/270,254

(22) PCT Filed: Dec. 24, 2021

(86) PCT No.: PCT/CN2021/141210
§ 371 (c)(1),
(2) Date: Jun. 29, 2023

(87) PCT Pub. No.: WO2022/143462
PCT Pub. Date: Jul. 7, 2022

(65) Prior Publication Data
US 2024/0056698 A1    Feb. 15, 2024

(30) Foreign Application Priority Data

Dec. 30, 2020   (CN) .......................... 202011612131.7

(51) Int. Cl.
*H04N 25/76* (2023.01)
*H04N 5/14* (2006.01)
*H04N 23/60* (2023.01)

(52) U.S. Cl.
CPC ............. *H04N 25/76* (2023.01); *H04N 5/144* (2013.01); *H04N 23/60* (2023.01)

(58) Field of Classification Search
CPC ........ H04N 25/76; H04N 23/60; H04N 5/144; H04N 25/707; H04N 25/00; H04N 25/78
See application file for complete search history.

(56) References Cited

U.S. PATENT DOCUMENTS 10,686,968 B1 *  6/2020  Wei ......................... H04N 5/144

FOREIGN PATENT DOCUMENTS

| JP | 2019030002 A | * | 2/2019 | ........... H04N 25/778 |
| WO | WO-2017056248 A1 | * | 4/2017 | ........... H04N 25/616 |
| WO | WO-2020153622 A1 | * | 7/2020 | ........... H04N 23/951 |
| WO | WO-2021124774 A1 | * | 6/2021 | ........... H04N 25/709 |

* cited by examiner

Primary Examiner — Lin Ye
Assistant Examiner — Steven Daniel Barry
(74) Attorney, Agent, or Firm — Andrew C. Cheng

(57) ABSTRACT

The present invention is to provide an image signal detection circuit, a control method, and a motion detection method. The image signal detection circuit comprises at least one acquisition module, the acquisition module comprises at least one acquisition sub-module, the acquisition sub-module comprises a capacitor to acquire the difference between a pair of two consecutive frames of pixel signals by taking a reference voltage as a reference. The image signal detection circuit and a motion detection circuit are structurally simple and easy to implement. It can realize motion detection at increased difference detection speed without analog-to-digital conversion.

10 Claims, 4 Drawing Sheets

IMAGE SIGNAL DETECTION CIRCUIT, CONTROL METHOD AND MOTION DETECTION METHOD

CROSS-REFERENCE TO RELATED APPLICATION

This application claims priority of International Patent Application Serial No. PCT/CN2021/141210, filed on Dec. 24, 2021, which is related to and claims priority of Chinese Patent Application Serial No. CN202011612131.7, filed on Dec. 30, 2020. The entirety of each of the above-mentioned patent applications is hereby incorporated herein by reference and made part of this specification.

TECHNICAL FIELD

The disclosure relates to the technical field of integrated circuit design, in particular to an image signal detection circuit, a control method and a motion detection method.

BACKGROUND

At present, generally, a motion detection method applied into an image sensor includes comparing digital signals of two frames of images which are converted by an analog-to-digital converter. Therefore the readout time of the signals is limited by the conversion time of the analog-to-digital converter, which may reduce the maximum achievable frame rate of the image sensor and takes more time for motion detection. In addition, in a current method of comparing digital signals for motion detection, ISP (Image Signal Processing) is added on-chip or off-chip, either way, additional area and power consumption are required, and the system cost is increased.

In conclusion, it is necessary to provide an image signal detection circuit, a control method and a motion detection method without analog-to-digital conversion and software assistance, thereby improving the processing speed and reducing the development costs.

SUMMARY

According to a first aspect of the present invention, an image signal detection circuit comprising: at least one acquisition module, each of which comprising at least one acquisition sub-module; wherein the acquisition sub-module comprises a first switch, a second switch and a capacitor; one end of the first switch is set as an input end of the acquisition sub-module and is connected to a pixel signal source, the other end of the first switch is connected to a first end of the capacitor; a second end of the capacitor is set as an output end of the acquisition sub-module, and is connected to one end of the second switch; the other end of the second switch is connected to a reference voltage source.

Optionally, the acquisition module comprises at least two acquisition sub-modules, and the acquisition sub-modules in the same acquisition module are connected to a same pixel signal source.

Optionally, the image signal detection circuit further comprises at least one comparison module, each of which comprising a comparator, a logic unit, at least one third switch, a fourth switch and a fifth switch, an output end of each of the acquisition sub-modules is connected to a first input end of the comparator, and the acquisition sub-modules are respectively connected to the comparator through different third switches; a second input end of the comparator is connected to a lower limit voltage source through the fourth switch, and is also connected to an upper limit voltage source through the fifth switch; the comparator is configured to output a first signal when a signal at the first input end is greater than a signal at the second input end, and output a second signal when the signal at the first input end is less than the signal at the second input end; the logic unit is configured to receive the first signal or the second signal output by the comparator and output a signal according to preset logic.

Optionally, the preset logic comprises, outputting a first preset signal if a third signal is the same as a fourth signal; and outputting a second preset signal or not outputting any signals if the third signal is different from the fourth signal; wherein the third signal refers to a signal output by the comparator when the third switch and the fourth switch are closed simultaneously, the fourth signal refers to a signal output by the comparator when the third switch and the fifth switch are closed simultaneously.

Optionally, when the fourth signal is predictable based on a received third signal, the logic unit is configured to use the predicted fourth signal as a received fourth signal and output the signal according to the preset logic, or when the third signal is predictable based on a received fourth signal, the logic unit is configured to use the predicted third signal as the received third signal and output the signal according to the preset logic.

Optionally, a voltage of the lower limit voltage source is equal to a voltage of the reference voltage source minus an allowable error voltage, and a voltage of the upper limit voltage source is equal to the voltage of the reference voltage source plus the allowable error voltage.

According to a second aspect of the present invention, the invention provides a control method, which is used for controlling the image signal detection circuit to detect two consecutive frames of pixel signals and output a detection result, the control method comprises: during detecting a first frame signal by the acquisition sub-module, simultaneously closing the first switch and the second switch of the acquisition sub-module for a first closure duration greater than or equal to a first preset duration; by the end of detecting the first frame signal by the acquisition sub-module, opening the first switch and the second switch of the acquisition sub-module; during detecting a second frame signal by the acquisition sub-module, closing the first switch of the acquisition sub-module for a second closure duration greater than or equal to a second preset duration; the first frame signal is a signal of a first frame of a pair of two consecutive frames of pixel signals received by the acquisition sub-module, and the second frame signal is a signal of a second frame of the pair of two consecutive frames of the pixel signals received by the acquisition sub-module.

Optionally, different acquisition sub-modules of the same acquisition module detect different pairs of two consecutive frames, thus all the pairs of two consecutive frames of the pixel signals can be detected by the acquisition module.

Optionally, one of the acquisition sub-modules of the acquisition module detects pairs of two consecutive frames whose first frame signals are odd-numbered frame signals, the other one of the acquisition sub-modules of the acquisition module detects pairs of two consecutive frames whose first frame signals are even-numbered frame signals, the two acquisition sub-modules work alternately and continuously to detect all the pairs of two consecutive frames of the pixel signals.

Optionally, during detecting the second frame signal by the acquisition sub-module, after closing the first switch of the acquisition sub-module for at least the second preset duration, closing the third switch corresponding to the acquisition sub-module; by the end of detecting the second frame signal by the acquisition sub-module, opening the first switch and the third switch; during the closure duration of any one of the third switches of the comparison module, closing the fourth switch or the fifth switch to drive the comparator to output the third signal or the fourth signal, and then opening the fourth switch or the fifth switch, closing the fifth switch or the fourth switch to drive the comparator to output the fourth signal or the third signal, and opening the fifth switch or the fourth switch.

According to a third aspect of the present invention, the invention provides a motion detection circuit, wherein, the motion detection circuit comprises a camera module and the image signal detection circuit mentioned above, the camera module outputs an image signal stream of a captured region, and an input end of the acquisition module is connected to an output source of a pixel signal stream in the image signal stream.

According to a fourth aspect of the present invention, the invention provides a motion detection method, wherein, the motion detection method comprises: controlling the image signal detection circuit of the motion detection circuit mentioned above by the control method mentioned above; judging whether a moving object exists in a photographed region according to the output signal of the image signal detection circuit.

The present invention utilizes a capacitor charge coupling phenomenon to obtain a difference between a pair of two consecutive frames of the pixel signals at the second end of the capacitor by taking the reference voltage as a reference. On one hand, the image signal detection circuit and the motion detection circuit of the present invention can be combined with an existing CIS readout circuit architecture, thus a structure thereof is simple and easy to realize, and cost is reduced. On the other hand, when the motion detection is realized by the motion detection method of the present invention, it does not require the analog-to-digital conversion, which increases the speed of difference detection.

In accompanying drawings:
1-acquisition sub-module; 2-comparison module; 3-pixel structure; 10-capacitor; 11-first switch; 12-second switch; 13-third switch; 14-fourth switch; 15-fifth switch; 21-comparator; 22-logic unit

DETAILED DESCRIPTION

The specific embodiments of the present invention will be further described in detail below with reference to the accompanying drawings.

It should be noted that, in the following specific embodiments, when describing the embodiments of the present invention in detail, in order to clearly represent the structure of the present invention and facilitate the description, the structures in the accompanying drawings are not drawn according to the general scale, and the Partial enlargement, deformation and simplification of processing are shown, therefore, it should be avoided to interpret this as a limitation of the present invention.

Figure 1:
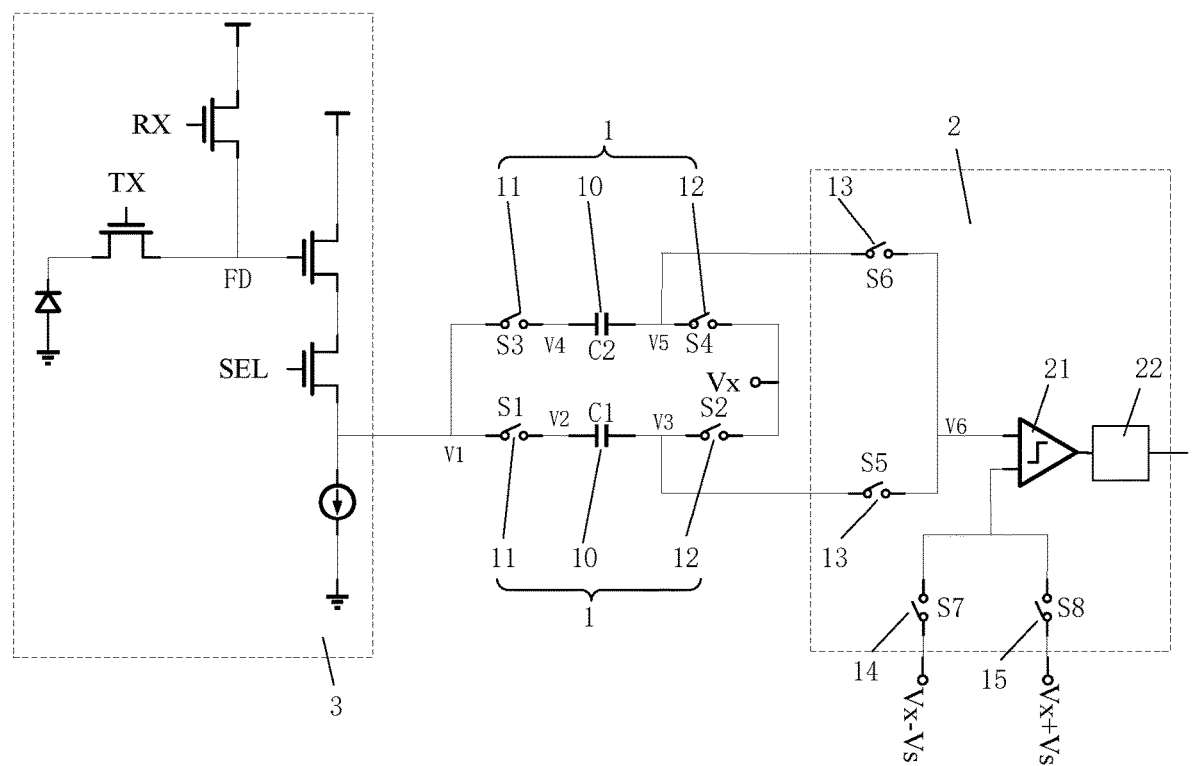
FIG. 1 is a schematic circuit diagram of an image signal detection circuit of an embodiment of the present invention.
Figure 2:
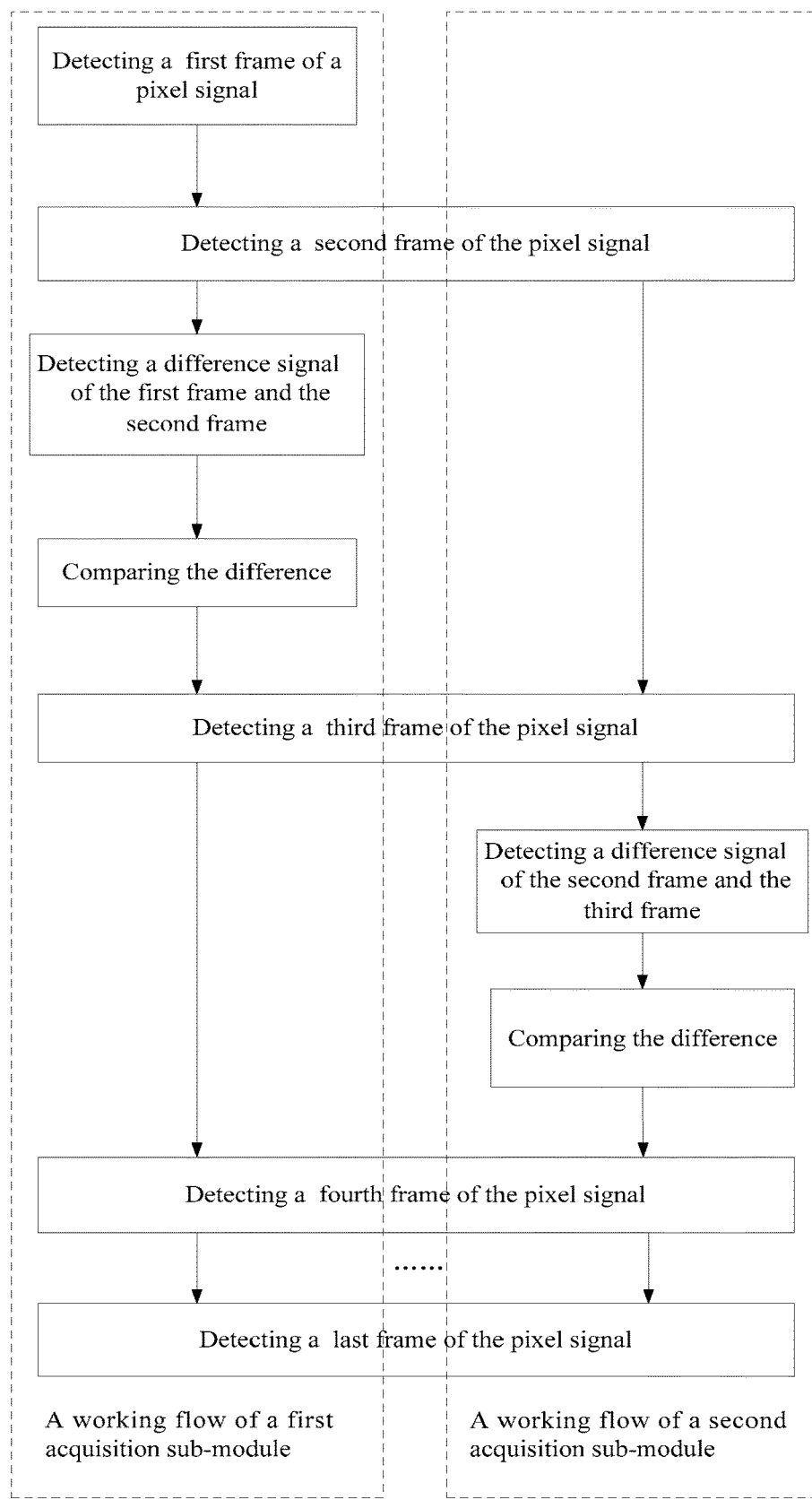
FIG. 2 is a schematic flow diagram of an alternating work of two acquisition sub-modules according to an embodiment of the present invention.
Figure 3:
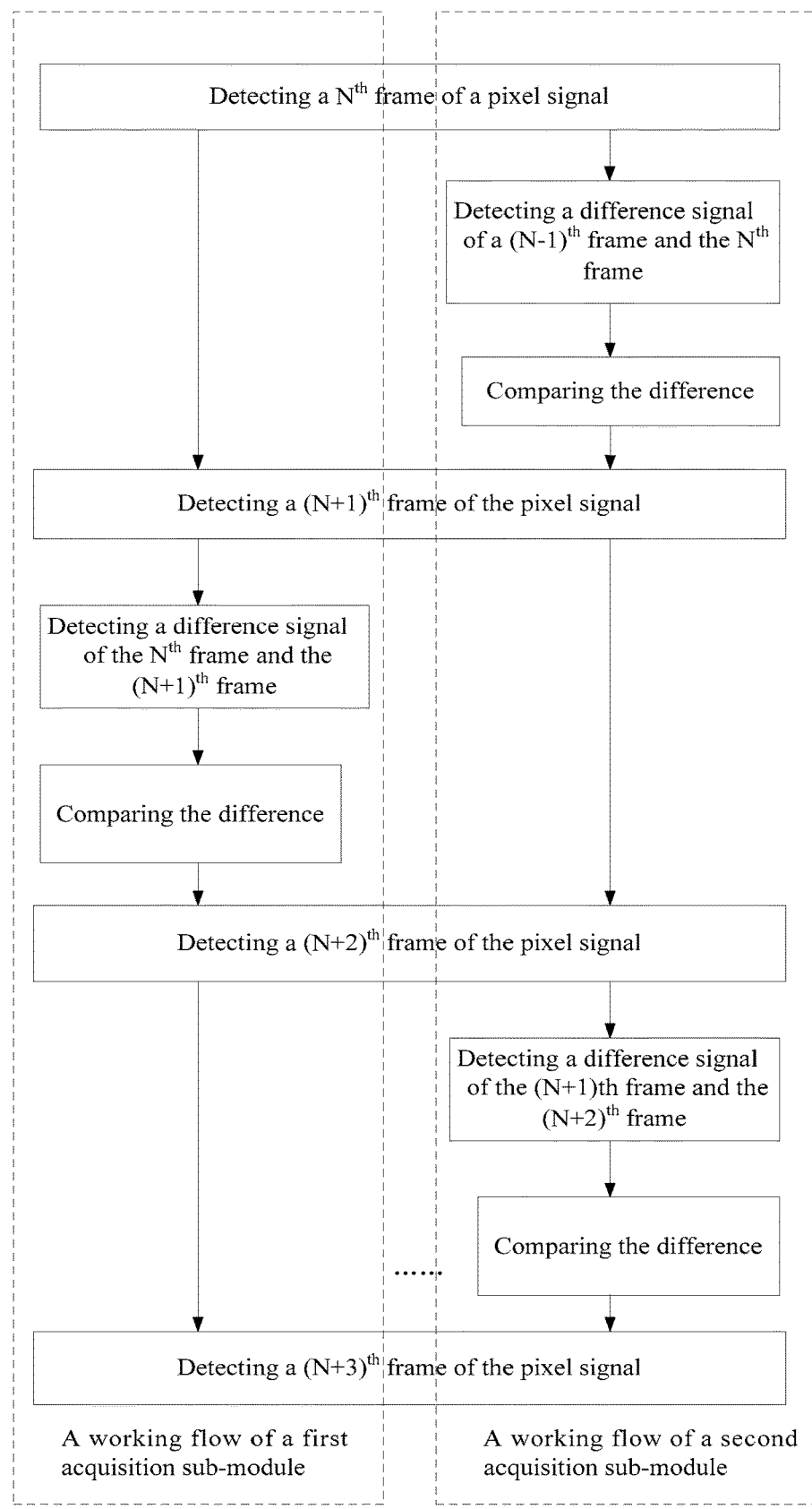
FIG. 3 is a schematic flow diagram of an alternating work of two acquisition sub-modules from $N^{th}$ frame to $(N+3)^{th}$ frame according to an embodiment of the present invention.
Figure 4:
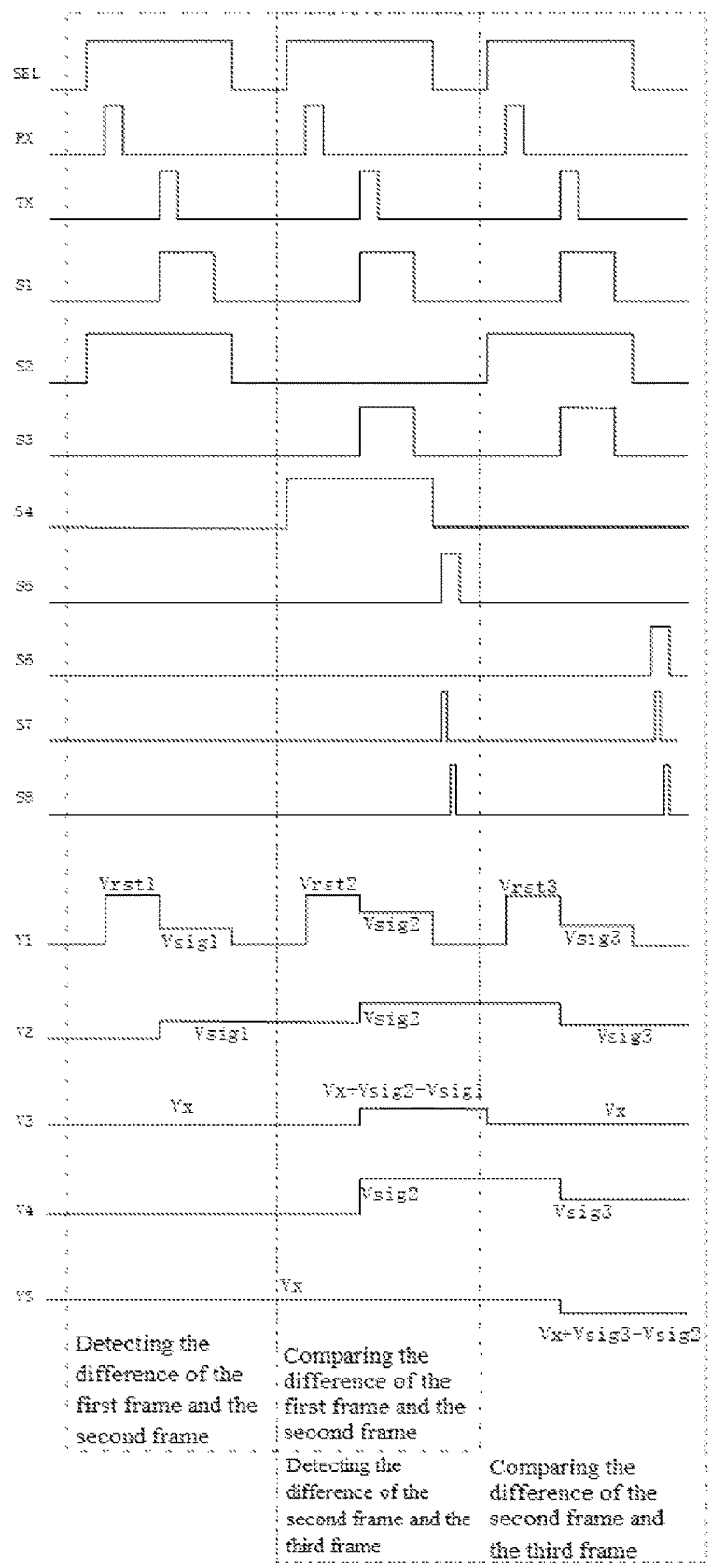
FIG. 4 is a circuit output waveform diagram of an image signal detection circuit in a working condition according to an embodiment of the present invention.

FIG. 1 is a schematic circuit diagram of an image signal detection circuit of an embodiment of the present invention; FIG. 2 is a schematic flow diagram of an alternating work of two acquisition sub-modules according to an embodiment of the present invention; FIG. 3 is a schematic flow diagram of an alternating work of two acquisition sub-modules from $N^{th}$ frame to $(N+3)^{th}$ frame according to an embodiment of the present invention; FIG. 4 is a circuit output waveform diagram of an image signal detection circuit in a working condition according to an embodiment of the present invention.

As shown in FIG. 1, the image signal detection circuit proposed by this embodiment comprises an acquisition module, the acquisition module comprises two acquisition sub-modules 1. Each of the acquisition sub-modules 1 comprises a first switch 11, a second switch 12 and a capacitor 10. One end of the first switch 11 is set as an input end of the acquisition sub-module 1 and is configured to connect a pixel signal source, the other end of the first switch 11 is connected to a first end of the capacitor 10, and a second end of the capacitor 10 is set as an output end of the acquisition sub-module 1. The second end of the capacitor 10 is also connected to one end of the second switch 12, the other end of the second switch 12 is connected to a reference voltage source, and the reference voltage source is configured to provide a reference voltage, which is Vx.

A control method of the image signal detection circuit comprises, during detecting a first frame signal by the acquisition sub-module 1, simultaneously closing the first switch 11 and the second switch 12 of the acquisition sub-module for a first closure duration greater than or equal to a first preset duration; by the end of detecting the first frame signal by the acquisition sub-module, opening the first switch 11 and the second switch 12 of the acquisition sub-module; during detecting a second frame signal by the acquisition sub-module 1, closing the first switch 11 of the acquisition sub-module 1 for a second closure duration greater than or equal to a second preset duration. The first frame signal is a first frame of a pair of two consecutive frames of pixel signals detected by the acquisition sub-module 1, and the second frame signal is a second frame of the pair of two consecutive frames of the pixel signals detected by the acquisition sub-module 1. The first preset duration and the second preset duration are the shortest time for the capacitor 10 to fully exchange charges with the pixel signal source to reach a steady state. When all components and parameters of the image signal detection circuit are fixed, specific values of the first preset duration and the second preset duration can be obtained through theoretical calculations or experimental methods, which is not detailed here.

Please refer to FIG. 4, which illustrates waveforms of a first end voltage V2 and a second end voltage V3 of a capacitor 10, and refer to FIG. 1, which illustrates measuring points of V2 and V3. In the first frame, the first end voltage is equal to a voltage Vsig1 output by the pixel structure 3, and the second end voltage is equal to the reference voltage Vx. In the second frame, the first end voltage of the capacitor 10 is equal to a voltage Vsig2, and variation range of the capacitor 10 is the voltage Vsig2 minus the voltage Visg1

(Vsig2−Visg1), and the second end voltage (which is used as a difference signal) of the capacitor 10 is the reference voltage Vx plus the voltage Vsig2 and minus the voltage Visg1(Vx+Vsig2−Visg1), and the difference signal is represented as a difference between a pair of two consecutive frames of pixel signals by taking the reference voltage (Vx) as a reference. Based on the difference signal, a logical judgment is made to confirm whether the pair of two consecutive frames of the pixel signals output by the pixel structure 3 suddenly changes. Further, based on an image signal stream, it can be judged whether an object is in a moving state. Processing of the image signal stream comprises processing of each of pixels. A motion detection circuit can be constructed based on the image signal detection circuit.

In this embodiment, the pixel structure 3 comprises a 4T structure, and a working principle thereof is as follows: when a SEL signal is at high level, the pixel structure 3 outputs a signal, when a RX signal is at high level, the pixel structure 3 outputs a reset signal (which is a Vrst signal), and when a TX signal is at high level, the pixel structure 3 outputs a transfer signal (which is a Vsig signal), therefore the pixel signal is the Vrst signal minus theVsig signal (Vrst-Vsig), wherein the Vrst signal is a constant value. According to the embodiment, since the judgment is performed based on the difference between the two pixel signals, and the Vsig signal can be used to represent the pixel signal.

As shown in FIG. 1, preferably, one acquisition module is configured to detect a pixel signal stream in the image signal stream, and the acquisition module comprises at least two acquisition sub-modules 1. The acquisition sub-modules 1 of the same acquisition module are configured to be connected to the same pixel signal source. The number of the acquisition modules should be equal to the resolution of the image signal stream. In the same acquisition module, different acquisition sub-modules are configured to detect pixel signals of different pairs of two consecutive frames, and the acquisition module is configured to detect pixel signals of the pairs of two consecutive frames.

The pixel signal mutation can be judged by the image signal detection circuit, so as to judge whether the object is in a moving state. For example, the acquisition module comprises four acquisition sub-modules 1, and each of the acquisition sub-modules 1 is configured to output difference signals corresponding to different pairs of two consecutive frames of pixel signals. A first acquisition sub-module outputs a difference signal corresponding to a pair of two consecutive frames of the pixel signals started with the 4 k frame, a second acquisition sub-module outputs a difference signal corresponding to a pair of two consecutive frames of the pixel signals started with the 4 k+1 frame, a third acquisition sub-module outputs a difference signal corresponding to a pair of two consecutive frames of the pixel signals started with the 4 k+2 frame, and a fourth acquisition sub-module outputs a difference signal corresponding to a pair of two consecutive frames of the pixel signals started with the 4 k+3 frame. Preferably, the acquisition module can comprise two acquisition sub-modules 1 (as shown in FIG. 1) for detecting all the pairs of two consecutive frames of the pixel signals. One acquisition sub-module 1 corresponds to the pairs of two consecutive frames whose first frame signal is an odd frame, and the other acquisition sub-module 1 corresponds to the pairs of consecutive frames whose first frame signal is an even frame so as to detect whether each frame of the pixel signals changes, and improve component utilization rate. A workflow of the acquisition sub-module 1 of the present embodiment is shown in FIG. 2 and FIG. 3. The first acquisition sub-module comprises a capacitor C1, the second acquisition sub-module comprises a capacitor C2. The two acquisition sub-modules work alternately, and detect difference of any two continuous frame signal. It should be understood that during detecting the first frame signal, the second acquisition sub-module does not collect pixel signals, and during detecting remaining frame signals, the two acquisition sub-modules 1 both collect each frame of the pixel signals.

The image signal detection circuit also comprises at least one comparison module 2. The comparison module 2 comprises a comparator 21, a logic unit 22, at least a third switch 13, a fourth switch 14 and a fifth switch 15. An output end of each of the acquisition sub-modules 1 is connected to a first input end of the comparators 21, and the acquisition sub-modules 1 are respectively connected to the comparator 21 through different third switches 13. A second input end of the comparator 21 is connected to a lower limit voltage source through the fourth switch 14, the second input end of the comparator 21 is also connected to an upper limit voltage source through the fifth switch 15, and the comparator 21 is configured to output the first signal when a signal received by the first input end is greater than a signal received by the second input end, and output the second signal when the signal received by the first input end is smaller than the signal received by the second input end. The logic unit 22 receives a signal output by the comparator 21 and outputs a signal according to a preset logic. Wherein, the signals at the first input end are obtained by the acquisition sub-module.

For example, the first input end of the comparator 21 can obtain an output voltage of acquisition sub-module 1, and the second input end of the comparator 21 can obtain an upper limit voltage and an lower limit voltage. Based on the above-mentioned circuit structure, the logic unit 22 determines whether the detected pixel signal changes based on the preset logic according to the signal output by the comparator 21.

The preset logic comprises, if a third signal is the same as a fourth signal, outputting a first preset signal; if not, outputting a second preset signal or not outputting a signal. The third signal refers to a signal output by the comparator when the third switch 13 and the fourth switch 14 are closed simultaneously, and the fourth signal refers to a signal output when the third switch 13 and the fifth switch 15 are closed simultaneously. The first preset signal can be any preset signal, for example, a high level, a low level, a rising edge, a falling edge, a preset voltage value, etc. When the first preset signal is output, it can be determined that the pixel signal changes. The second preset signal can be any signal different from the first preset signal. The circuit can expand other functions according to the second preset signal.

For example, the comparator 21 can firstly obtain the lower limit voltage, and then obtain the upper limit voltage, the first signal is at high level, and the second signal is at low level. When the pixel signal does not change, the output voltage of the corresponding acquisition sub-module 1 is between the lower limit voltage and the upper limit voltage. The third signal received by the logic unit 22 is at high level, and the fourth signal is at low level. Since the third signal is different from the fourth signal, the logic unit 22 judges that the pixel signal has not changed and outputs a second preset signal or does not output a signal. When the pixel signal changes, the output voltage of the corresponding acquisition sub-module 1 is higher than the upper limit voltage or lower than the lower limit voltage. If higher, the third signal and the fourth signal are both at high level, if lower, the third signal and the fourth signal are both at low level. Since the third signal and the fourth signal are the same, the logic unit 22 outputs the first preset signal. It should be understood that time nodes for receiving the third signal and the fourth signal by the logic unit 22 are different, for example, the logic unit 22 receives the third signal and the fourth signal in real time. For another example, a signal output firstly by the comparator 21 is stored by a delay element, which arrives at the logic unit 22 simultaneously with a signal output later by the comparator 21. Again for instance, both the third signal and the fourth signal are all delayed, the time node that the comparator 21 outputs a signal is different from the time node that the logic unit 22 receives a signal, or the signals are not in the same frame. For example, a signal output by the comparator 21 is delayed firstly, adjusted in timing and then input to the logic unit 22, etc. The logic unit 22 performs logic judgment according to the third signal and the fourth signal. The comparison module 2 or the logic unit 22 can be set to avoid interaction between the third signal and the fourth signal triggered by non-identical difference signals. For example, when the third signal and the fourth signal are input to the logic unit 22 sequentially, the logic unit 22 can temporarily store the first obtained signal, compare it with the second obtained signal, and then clear the temporary storage. It should be understood that the comparison module 2 is configured to analyze a signal output by the acquisition sub-module 1, judge whether it belongs to a reasonable interval, and then output the signal according to the judgment result.

The logic unit 22 is configured to make a judgment according to the preset logic without waiting for the input of the fourth signal or the third signal when the fourth signal or the third signal can be predicted. For example, when the third signal is at low level, it is inferred that the output voltage of the acquisition sub-module 1 is lower than the lower limit voltage, then the fourth signal is at low level, and the logic unit 22 can judge in advance to increase the sensitivity of the circuit.

During detecting the second frame signal by each of the acquisition sub-modules 2, after the first switch 11 of the acquisition sub-module being closed, at least after the second preset duration, the third switch 13 corresponding to the acquisition sub-module 1 is closed; by the end of detecting the second frame signal by each of the acquisition sub-modules 1, the first switch 11 and the third switch 13 corresponding to each of the acquisition sub-modules 1 are opened; during the closure duration of any one of the third switch 13 in each of the comparison modules 2, the fourth switch 14 or the fifth switch 15 is closed to drive the comparator 21 to output the third signal or the fourth signal, then the fourth switch 14 or the fifth switch 15 is opened, and the fifth switch 15 or the fourth switch 14 is closed to drive the comparator 21 to output the fourth signal or the third signal, and the fifth switch 15 or the fourth switch 14 is opened. As shown in FIG. 1, the image signal detection circuit comprises a comparison module 2, the output ends of all the acquisition sub-modules 1 are connected to the first input end of the comparison module 2. In other embodiments, there are multiple comparison modules 2. The acquisition sub-module 1 is connected to the comparison module 2 arbitrarily, preferably, the acquisition sub-modules 1 in the same acquisition module are connected to one comparison module 2. It should be understood that the third switch 13 can be closed before or after the first switch 11 being opened, that is, the difference signal can be obtained synchronously or asynchronously with the second frame of the pixel signal. When the difference signal is obtained synchronously with the second frame signal, a reading end for the difference signal (that is, the first input end of the comparison module 2) must be a high-impedance input end.

Preferably, the lower limit voltage is equal to the reference voltage (Vx) minus an allowable error voltage (Vs), and the upper limit voltage is equal to the reference voltage Vx plus the allowable error voltage Vs.

The comparator 21 is an op amp voltage comparator, which comprises a single-stage or multi-stage structure, a structure with or without an enable signal, a multiplex or non-multiplex analog-to-digital conversion circuit.

As shown in FIG. 4, measurement points of SEL, RX, TX and V1~V5 signals in FIG. 4 can refer to FIG. 1, S1~S8 represents control signals of switches S1~S8 in FIG. 1. When a control signal is at high level, it means that a corresponding switch thereof is closed and turned on, and when the control signal is at low level, it means that the switch is opened and turned off. It should be understood that a first frame in FIG. 4 is the first frame when the image signal detection circuit starts to work, and waveforms of the signals S3, S6, S7, S8, V4, and V5 are all at low level.

In FIG. 4, the motion detection of the first frame and the second frame are realized by the first acquisition sub-module, and the motion detection of the second frame and the third frame are realized by the second acquisition sub-module. According to the time series of a 4T pixel structure, a reset signal Vrst and a transfer signal Vsig are output in one frame. When SEL is at high level, the pixel signal is output. When RX is at high level, the reset signal Vrst is output by the pixel structure, When TX is at high level, the transfer signal Vsig is output by the pixel structure. The pixel signal is Vrst minus Vsig (Vrst-Vsig), or it can be represented as Vsig.

During the transmission of the first frame reset signal, the control signal S1 is at low level, the control signal S2 is at high level, the control signals S3 and S4 are at low level. At this time, the switch S2 is closed, the switches S1, S3 and S4 are all opened, the first acquisition sub-module works while and the second acquisition sub-module does not work, and V1=Vrst1, V3=Vx.

During the transmission of the first frame transfer signal, the control signals S1 and S2 are at high level, S3 and S4 are at low level. At this time, the switches S1 and S2 are closed, S3 and S4 are opened, the first acquisition sub-module works while the second acquisition sub-module does not work, V1=V2=Vsig1, V3=Vx, and the first frame of the pixel signals is obtained by the first acquisition sub-module.

During the transmission of the second frame reset signal, the control signals S1, S2, S3 and S4 are at low level. At this time, the second acquisition sub-module works while the first acquisition sub-module does not work, the switches S1 and S2 are opened, V1=Vrst2, V2=Vsig1, V3=Vx, V5=Vx.

During the transmission of the second frame transfer signal, the control signals S1 and S3 are at high level, S2 and S4 are at low level. At this time, the switches S1, S3 and S4 are closed, S2 is opened, the first acquisition sub-module and the second acquisition sub-module both work. V4=V2=V1=Vsig2, V5=Vx, and the second frame of the pixel signals is obtained by the second acquisition sub-module.

In order to compare the first frame with the second frame of the pixel signals, the control signal S5 is set at high level while the control signal S6 is set at low level. At this time, the switch S5 is closed while the switch S6 is opened, V6=V3=Vx+Vsig2−Vsig1. The output signal V6 of the acquisition sub-module is compared with the upper limit voltage and the lower limit voltage respectively. When the output signal V6 of the acquisition sub-module is compared with the lower limit voltage, the control signal S7 is set at high level and the control signal S8 is set at low level. At this time, the switch S7 is closed while the switch S8 is opened, V7=Vx−Vs. The op amp voltage comparator compares V6 and V7 for the first time (comparing Vx+Vsig2−Vsig1 with Vx−Vs). When the output signal V6 of the acquisition sub-module is compared with the upper limit voltage, the control signal S7 is set at low level and the control signal S8 is set at high level. At this time, the switch S7 is opened while the switch S8 is closed, V7=Vx+Vs. The op amp voltage comparator compares V6 and V7 for the second time (comparing Vx+Vsig2−Vsig1 with Vx+Vs). According to the comparison result, if Vx−Vs<Vsig2−Vsig1<Vs, the first frame and the second frame of the pixel signals do not change, there is no movement of an object captured by a corresponding pixel. If Vsig2−Vsig1<−Vs or Vsig2−Vsig1>Vs, the first frame and the second frame of the pixel signals change, there is movement of the object captured by the pixel.

During the transmission of the third frame reset signal, the control signals S1, S3 and S4 are set at low level, the control signal S2 is set at high level, the first acquisition sub-module works while the second acquisition sub-module does not work, the switches S1, S3 and S4 are all opened, the switch S2 is closed, V1=Vrst3, V3=Vx, V4=Vsig2, V5=Vx.

During the transmission of the third frame transfer signal, the control signals S1, S2, and S3 are at high level, and the control signal S4 is set at low level. At this time, the switches S1, S2 and S3 are closed, the switch S4 is opened. The first acquisition sub-module and the second acquisition sub-module both work. V4=V2=V1=Vsig3, V3=Vx, and the third frame of the pixel signals is obtained by the first acquisition sub-module.

In order to compare the second frame with the third frame of the pixel signals, the control signal S5 is set at low level, the control signal S6 is set at high level. At this time, the switch S5 is opened while the switch S6 is closed, V6=V5=Vx+Vsig3−Vsig2. When the output signal V6 of the acquisition sub-module is compared with the lower limit voltage, the control signal S7 is set at high level and the control signal S8 is set at low level. At this time, the switch S7 is closed while the switch S8 is opened, V7=Vx−Vs. The op amp voltage comparator compares V6 and V7 for the first time (comparing Vx+Vsig3−Vsig2 with Vx−Vs). When the output signal V6 of the acquisition sub-module is compared with the upper limit voltage, the control signal S7 is set at low level and the control signal S8 is set at high level. At this time, the switch S7 is opened, the switch S8 is closed, V7=Vx+Vs. The op amp voltage comparator compares V6 and V7 for the second time (comparing Vx+Vsig3−Vsig2 with Vx+Vs). According to two comparison results, if Vx−Vs<Vsig3−Vsig2<Vs, the second frame and the third frame of the pixel signals do not change, there is no movement of the object captured by the pixel. If Vsig3−Vsig2<−Vs or Vsig3−Vsig2>Vs, the second frame and the third frame of the pixel signals change, there is movement of the object captured by the pixel.

This embodiment also discloses a motion detection circuit, comprising a camera module and the above-mentioned image signal detection circuit. The camera module outputs the image signal stream of the captured region, an input end of each of the acquisition modules is connected to an output source of a pixel signal stream in the image signal stream.

This embodiment also discloses a motion detection method, comprising: performing the above-mentioned control method to control the image signal detection circuit of the above-mentioned motion detection circuit; judging whether a moving object exists in a photographed region according to the output signal of the image signal detection circuit.

Specifically, the judgment is made according to the total number of the first preset signals output in the same frame, for example, if the first preset signal is output by one of the image signal detection circuits, that is, the object is moving. Or the judgment is made according to relative positional relationship of the image signal detection circuit, for example, when a specific pattern is made by the first preset signal output in the same frame, that is, the object is moving. The number of acquisition modules is equal to the resolution of the image signal stream, each of the acquisition modules is corresponding to a pixel signal stream. If the number of comparison modules 2 is equal to the resolution, one acquisition module is corresponding to one comparison module 2; if the number of comparison modules 2 is smaller than the resolution, the total number of comparison modules 2 is equal to the number of lines of the image signal stream. In addition, the motion detection method can be used in conjunction with motion detection methods of other principles. The above are only the preferred embodiments of the present invention, and the embodiments are not intended to limit the scope of patent protection of the present invention. Therefore, any equivalent structural changes made by using the contents of the description and drawings of the present invention shall also comprise within the protection scope of the present invention.

What is claimed is:

1. An image signal detection circuit, comprising at least one acquisition module, each of which comprising at least one acquisition sub-module; wherein the acquisition sub-module comprises a first switch, a second switch and a capacitor;
    one end of the first switch is set as an input end of the acquisition sub-module and is connected to a pixel signal source, the other end of the first switch is connected to a first end of the capacitor;
    a second end of the capacitor is set as an output end of the acquisition sub-module, and is connected to one end of the second switch;
    the other end of the second switch is connected to a reference voltage source;
    the image signal detection circuit further comprises at least one comparison module, each of which comprising a comparator, a logic unit, at least one third switch, a fourth switch and a fifth switch, wherein,
    an output end of each of the acquisition sub-modules is connected to a first input end of the comparator, and the acquisition sub-modules are respectively connected to the comparator through different third switches;
    a second input end of the comparator is connected to a lower limit voltage source through the fourth switch, and is also connected to an upper limit voltage source through the fifth switch;
    the comparator is configured to output a first signal when a signal at the first input end is greater than a signal at the second input end, and output a second signal when the signal at the first input end is less than the signal at the second input end;
    the logic unit is configured to receive the first signal or the second signal output by the comparator and output a signal according to preset logic.

2. The image signal detection circuit of claim 1, wherein, the acquisition module comprises at least two acquisition sub-modules, and the acquisition sub-modules in the same acquisition module are connected to a same pixel signal source.

3. The image signal detection circuit of claim 1, wherein, a voltage of the lower limit voltage source is equal to a voltage of the reference voltage source minus an allowable error voltage, and a voltage of the upper limit voltage source is equal to the voltage of the reference voltage source plus the allowable error voltage.

4. A motion detection circuit, wherein, the motion detection circuit comprises a camera module and the image signal detection circuit according to claim 1, the camera module outputs an image signal stream of a captured region, an input end of the acquisition module is connected to an output source of a pixel signal stream in the image signal stream.

5. The image signal detection circuit of claim 1, wherein, the preset logic comprises, outputting a first preset signal if a third signal is the same as a fourth signal; and outputting a second preset signal or not outputting any signals if the third signal is different from the fourth signal;

wherein the third signal refers to a signal output by the comparator when the third switch and the fourth switch are closed simultaneously, the fourth signal refers to a signal output by the comparator when the third switch and the fifth switch are closed simultaneously.

6. The image signal detection circuit of claim 5, wherein, when the fourth signal is predictable based on a received third signal, the logic unit is configured to use the predicted fourth signal as a received fourth signal and output the signal according to the preset logic, or when the third signal is predictable based on a received fourth signal, the logic unit is configured to use the predicted third signal as the received third signal and output the signal according to the preset logic.

7. A control method for controlling the image signal detection circuit according to claim 1 to detect two consecutive frames of pixel signals and output a detection result, the control method comprises:

during detecting a first frame signal by the acquisition sub-module, simultaneously closing the first switch and the second switch of the acquisition sub-module for a first closure duration greater than or equal to a first preset duration;

by the end of detecting the first frame signal by the acquisition sub-module, opening the first switch and the second switch of the acquisition sub-module;

during detecting a second frame signal by the acquisition sub-module, closing the first switch of the acquisition sub-module for a second closure duration greater than or equal to a second preset duration;

the first frame signal is a signal of a first frame of a pair of two consecutive frames of pixel signals received by the acquisition sub-module, and the second frame signal is a signal of a second frame of the pair of two consecutive frames of the pixel signals received by the acquisition sub-module.

8. The control method of claim 7, further comprising:

during detecting the second frame signal by the acquisition sub-module, after closing the first switch of the acquisition sub-module for at least the second preset duration, closing the third switch corresponding to the acquisition sub-module;

by the end of detecting the second frame signal by the acquisition sub-module, opening the first switch and the third switch;

during the closure duration of any one of the third switches of the comparison module, closing the fourth switch or the fifth switch to drive the comparator to output the third signal or the fourth signal, and then opening the fourth switch or the fifth switch, closing the fifth switch or the fourth switch to drive the comparator to output the fourth signal or the third signal, and opening the fifth switch or the fourth switch.

9. The control method of claim 7, wherein, different acquisition sub-modules of the same acquisition module detect different pairs of two consecutive frames to enable all the pairs of two consecutive frames of the pixel signals be detected by the acquisition module.

10. The control method of claim 9, wherein, one of the acquisition sub-modules of the acquisition module detects pairs of two consecutive frames whose first frame signals are odd-numbered frame signals, the other of the acquisition sub-modules of the acquisition module detects pairs of two consecutive frames whose first frame signals are even-numbered frame signals, the two acquisition sub-modules work alternately and continuously to detect all the pairs of two consecutive frames of the pixel signals.

* * * * *